| United States Patent [19] | [11] | 4,170,658 |
|---|---|---|
| Skinner et al. | [45] | Oct. 9, 1979 |

[54] CALCIUM CARBONATE FILLER

[75] Inventors: David L. Skinner; Edward L. Moon, both of St. Petersburg, Fla.

[73] Assignee: The Georgia Marble Company, Atlanta, Ga.

[21] Appl. No.: 653,232

[22] Filed: Jan. 28, 1976

[51] Int. Cl.$^2$ ............................ C01F 5/24; C09C 1/02
[52] U.S. Cl. .................................................... 423/430
[58] Field of Search .................... 423/430; 106/288 R, 106/288 B, 306

Primary Examiner—O. R. Veritz
Assistant Examiner—Gary P. Straub
Attorney, Agent, or Firm—James W. Grace; Charles W. Vanecek

[57] ABSTRACT

An improved calcium carbonate filler in the form of a powder having a particle size distribution range and other identifiable physical characteristics produces unexpected results as a filler in resin molding compounds.

3 Claims, No Drawings

CALCIUM CARBONATE FILLER

BACKGROUND OF THE INVENTION

1. Field of the Invention

This invention finds its application in the field of resin molding compounds which are used in a wide variety of commercial applications from automotive parts, household appliances to business machines.

2. Description of the Prior Art

Resin molding compounds have been used for many years to produce molded products in the building construction and automotive fields. For example, automotive hoods, front grille elements, doors and other panels are now being made of molded resin to replace metal stamped parts. Not only does the use of resin molding technique enable greater design flexibility but there can be a great reduction in the number of individual parts or components. Other resin molded parts are rapidly finding their way in the consumer field as casings or housings for small appliances and in the business world as business machine housings and cabinets.

It is known that the resin component of the molding compounds is an expensive ingredient and adds to the cost of the finished product in greater proportion than any other ingredient. Thus, it is well-known technique to add fillers of various kinds to the resin to replace much of the resin with a view to economy. Obviously, for the same physical characteristics of a given molding compound, the greater the amount of filler, the more economical will be the ultimate product. Conversely, if, for the same amount of filler, a given filler will impart improved molding properties to the resin compound, for the same cost, greater flexibility in molding technique will be found. In other instances improvement in molding properties by a suitable filler will result in greater penetration of the resin compound into reinforcing ingredients such as glass fibers or filamentary mats.

SUMMARY OF THE INVENTION

This invention relates to a novel filler for resin compounds.

It is an object of the present invention to provide a novel resin compound filler which will permit increased production of compound with a reduction in the more costly resin component without reduction of molding properties.

It is another object of the present invention to provide a novel resin compound filler which will extend a given amount of resin to make more compound.

It is yet another object of the present invention to provide a novel resin compound filler which will produce enhanced molding properties with the same amount of filler.

It is still another object of the present invention to provide a novel resin filler which will provide improved properties in the final molded product without additional resin.

DESCRIPTION OF THE PREFERRED EMBODIMENTS

The following examples will show that (a) for a given amount of resin, the amount of the novel filler of the invention in the compound can be dramatically increased for the same viscosity. In this instance, viscosity will be used as a constant, as viscosity will, to a great extent, determine the workability of the resin compound, and (b) for a predetermined viscosity, the amount of the novel filler of the invention can be increased over comparable fillers to save money or to improve the physical characteristics of the final molded product.

In addition, the versatility of the novel filler of the invention will be shown by the fact that it imparts the improved results in various types of molding compounds and with various techniques of preparing molding compounds.

In the following examples, many of the ingredients will be referred to by their common trade names. Appended to the end of the description is an Exhibit A which will completely identify those ingredients. Exhibit A has subparts A1 (Polyester resins), A2 (Peroxide catalysts). For purposes of this disclosure, the novel calcium carbonate filler of the invention will be referred to as Gama-Sperse LV-10 as made by The Georgia Marble Company of Atlanta, Georgia. Exhibit C describes the calcium carbonate fillers. Other ingredients will be referred to by their common chemical names, and for completeness, Exhibit B is attached hereto to show other chemicals named in this invention and how they are utilized.

Before explaining the various examples cited hereinafter in terms of the improved filler of the invention, a short explanation of the techniques of resin molding is deemed to be helpful. There are two general techniques for resin molding; one is making a bulk molding compound, and the other a sheet molding compound. The bulk molding compound is a mixture of polyester resin, mineral filler, catalyst, mold release, colorants (optional), thickeners (optional) and generally ¼" chopped glass fibers or sisal fibers.

The mixture is prepared commercially in batch mixers; commonly a Baker-Perkins spiral blade or sigma blade mixer.

Any order of addition of ingredients may be followed, except that the reinforcing glass is generally added last. The bulk molding compound resembles wet grass or a paste mass with fibers prominent throughout. It may be compressed by extrusion into a rope-like form. Pieces of the rope of compound are cut or pulled from the bulk and placed in the mold. Fillers aid in flow control and help carry fibers to all parts of the part.

The sheet molding compound is a mixture of polyester resin, filler, catalyst, mold release, colorant (optional), thickener (necessary) and generally 1"-2" chopped glass fibers. The material is prepared in a manner to give a large flat sheet of molding compound. A "maturation" period is required for the thickener [MgO or Mg(OH)$_2$] to chemically thicken the polyester resin after it is formed into the sheet. This period is 48 hours to 7 days.

The molding compound is generally deposited on a polyethylene sheet as a paste in suitable thickness. Chopped glass is then distributed over the exposed paste as the sheet is moved over a conveyor belt. A second polyethylene sheet has the molding compound as a paste distributed over its underside. The two paste layers are brought together and the outer sheets are run between compacting rollers. The sandwich of sheet molding compound encased between the two polyethylene sheets is rolled up for packaging.

For molding, the sheet molded compound is unrolled and the films or sheets removed. A flexible, leathery sheet of molding compound is obtained. This is cut, weighed, stacked or rolled and placed in the mold.

Sheet molded compound generally has less filler than bulk molded compound since it must be of lower viscosity in order to penetrate and set the chopped glass fibers. Poor wetting of fibers results in delamination and defects in molded parts. Viscosity of sheet molded compound paste is a critical issue in sheet molded compound operations.

Having now explained the environment in which the filler is used, the following examples will be more specific.

EXAMPLE 1

A mixture (Example 1A) comprising 100 parts of Paraplex P-340 resin and 150 parts of Gama-Sperse 6451 filler was blended thoroughly with a paddle mixer. The time required to completely disperse the solid was 5 minutes. The viscosity of the resulting paste by Brookfield Helipath Viscometer was 35,000 cps. A similar mixture (Example 1B) comprising 100 parts of Paraplex P-340 and 150 parts of Gama-Sperse 6532 formed a homogeneous paste in 5 minutes with a viscosity of 50,000 cps. A similar mixture (Example 1C) comprising 100 parts of Paraplex P-340 and 150 parts of Camel-Wite dispersed in 5 minutes and the paste had a viscosity of 43,000 cps. A similar mixture (Example 1D) of 100 parts of Paraplex P-340 and 150 parts of Gama-Sperse LV-10 dispersed in 2 minutes and the paste viscosity was 22,000 cps. In the above examples, the mixing was carried on until complete dispersion of ingredients occurred.

|  | Parts by Weight | Time to Disperse minutes | Viscosity cps |
|---|---|---|---|
| Example 1A |  |  |  |
| Resin | 100 |  |  |
| Gama-Sperse 6451 filler | 150 | 5 | 35,000 |
| Example 1B |  |  |  |
| Resin | 100 |  |  |
| Gama-Sperse 6532 filler | 150 | 5 | 50,000 |
| Example 1C |  |  |  |
| Resin | 100 |  |  |
| Camel-Wite filler | 150 | 5 | 43,000 |
| Example 1D |  |  |  |
| Resin | 100 |  |  |
| Gama-Sperse LV-10 filler | 150 | 2 | 22,000 |

From this example, it is clear that the time for dispersal of the novel filler (Gama-Sperse LV-10) was 2 minutes, or less than ½ that of the other fillers and the viscosity was 22,000 cps. or about two thirds that of the next best filler. Thus, for the same loading, the novel filler of the invention not only cut the compounding time in about one half, but produced a compound with a sharply reduced viscosity. The wetting power and workability was increased markedly.

EXAMPLE 2

A sheet molding compound paste (Example 2A) comprising 100 parts of Glidpol 4297, 1 part of t-butyl perbenzoate, 150 parts of Gama-Sperse 6451, 2.5 parts of zinc stearate and 2.0 parts of magnesium hydroxide was blended thoroughly in a high shear mixer. The viscosity of the resultant paste was 37,000 cps. A similar paste (Example 2B) comprising 100 parts of Glidpol 4297, 1 part of t-butyl perbenzoate, 175 parts of Gama-Sperse LV-10, 2.5 parts of zinc stearate and 2.0 parts of magnesium hydroxide had a viscosity of 36,500 cps.

|  | Parts by Weight | Viscosity cps |
|---|---|---|
| Example 2A |  |  |
| Glidpol 4297 resin | 100 |  |
| t-butyl perbenzoate (catalyst) | 1 |  |
| Gama Sperse 6451 (filler) | 150 |  |
| Zinc Stearate | 2.5 |  |
| Magnesium hydroxide | 2.0 | 37,000 |
| Example 2B |  |  |
| Glidpol 4297 resin | 100 |  |
| t-butyl perbenzoate (catalyst) | 1 |  |
| Gama-Sperse LV-10 | 175 |  |
| Zinc stearate | 2.5 |  |
| Magnesium hydroxide | 2.0 | 36,500 |

From this example, it is seen that to achieve substantially the same viscosity of the compound, the loading of the novel filler of the invention was significantly higher, in fact, about 16% higher. Thus, for a given amount of resin (100 parts) a greater quantity of compound can be made. Thus, an economic gain is involved.

EXAMPLE 3

A sheet molding compound paste (Example 3A) comprising 100 parts of Paraplex P-19D, 150 parts of Gama-Sperse 6451, 1 part of t-butyl perbenzoate, 2 parts zinc stearate and 1 part magnesium hydroxide was blended for 8 minutes in a Baker-Perkins sigma blade mixer until a smooth paste was obtained. The viscosity of the paste by Brookfield Helipath Viscometer was 60,000 cps. at 98° F. A similar paste (Example 3B) comprising 100 parts of Paraplex D-19D, 200 parts of Gama-Sperse LV-10, 1 part of t-butyl perbenzoate, 2 parts of zinc stearate and 1 part of magnesium hydroxide formed a smooth paste in 5 minutes which had a viscosity of 62,000 cps at 97° F.

|  | Parts by Weight | Time of Blending Minutes | Viscosity cps |
|---|---|---|---|
| Example 3A |  |  |  |
| Paraplex P-19D resin | 100 |  |  |
| Gama Sperse 6451 | 150 |  |  |
| t-butyl perbenzoate | 1 |  |  |
| zinc stearate | 2 |  |  |
| Magnesium hydroxide | 1 | 8 | 60,000 |
| Example 3B |  |  |  |
| Paraplex P-19D resin | 100 |  |  |
| Gama-Sperse LV-10 | 200 |  |  |
| t-butyl perbenzoate | 1 |  |  |
| Zinc stearate | 2 |  |  |
| Magnesium hydroxide | 1 | 5 | 62,000 |

It is clear that again a greater quantity of the novel filler of the present invention was used for a fixed amount of resin to make a compound with substantially the same viscosity. It should be noted that the amount of time to blend the compound was remarkedly reduced.

EXAMPLE 4

The pastes described in Example 3 were used to prepare 20% glass reinforced sheet molding compound by impregnation of a single ply of glass mat composed of 1 inch glass fiber strands. The impregnated mat was rolled between polyethylene films and stored for 96 hours. During this time a chemical thickening of the polyester resin by the magnesium hydroxide occurred. When the films were removed from the impregnated mat, a flexible, non-sticky sheet of molding compound was obtained. This was cut into 6 inch×6 inch squares. Five plys of the thickened sheet molding compound sheet were used to form a test sample, which was molded in a two-piece, matched metal mold at 325° F. for 3 minutes. Test pieces were cut from the molded sample for a comparison of physical properties of sheet molding compound made by each of the formulations given in Example 3.

| Physical Properties of Sheet Molding Compound | | |
|---|---|---|
| Properties | 150 pbw Gama-Sperse 6451 | 200 pbw Gama-Sperse LV-10 |
| Flexural Strength[1] | 20,000 psi | 23,000 psi |
| Flexural Modulus[1] | $1.79 \times 10^6$ psi | $1.9 \times 10^6$ psi |
| Impact Strength[2] (notched) | 9.7 ft-lbs/inch | 10.7 ft-lbs/inch |
| Barcol Hardness[3] | 58 | 60 |

[1]ASTM D-790
[2]ASTM D-256
[3]Barcol Impressor - Barber-Colman Co. Rockford, Illinois From Example 4 it is seen that when about 33% more of the novel compound of the invention was used there was an increase in the flexural strength, the flexural modulus and impact strength. Again the amount of resin for the same quantity of molding compound was reduced with the filler of the invention as compared to the other filler.

EXAMPLE 5

A bulk molding compound paste prior to the addition of colorant and reinforcing fiber (Example 5A) comprising 100 parts Paraplex P-19P, 1 part t-butyl perbenzoate, 200 parts Gama-Sperse 6451 and 3 parts of zinc stearate was mixed for 10 minutes in a spiral blade mixer until a smooth paste was formed. The viscosity of the paste was found to be 900,000 cps at 77° F. by Brookfield Helipath Viscometer. A similar paste (Example 5B) comprising 100 parts of Paraplex P-19P, 1 part t-butyl perbenzoate, 245 parts of Gama-Sperse LV-10 and 3.0 parts of zinc stearate formed a smooth paste in less than 8 minutes with a viscosity of 950,000 cps at 77° F.

| | Parts by Weight | Time of Blending Minutes | Viscosity cps |
|---|---|---|---|
| Example 5A | | | |
| Resin | 100 | | |
| t-butyl perbenzoate | 1 | | |
| Gama-Sperse 6451 | 200 | | |
| Zinc stearate | 3 | 10 | 900,000 |
| Example 5B | | | |
| Resin | 100 | | |
| t-butyl perbenzoate | 1 | | |
| Gama-Sperse LV-10 | 245 | | |
| Zinc stearate | 3 | 8 | 950,000 |

For an increased loading of the novel filler of the invention (about 23% greater) the blending time was reduced by 20% and the viscosity was substantially unchanged in comparison to the more conventional filler.

EXAMPLE 6

An automotive grade sheet molding compound paste (Example 6A) comprising 60 parts of Stypol 40-2955, 33 parts of LP-40A, 7 parts styrene, 1 part t-butyl perbenzoate, 150 parts of Gama-Sperse LV-10, 4 parts zinc stearate and 1 part magnesium oxide was prepared in a Hobart mixer. The paste had a Brookfield Helipath viscosity of 45,000 cps. A glass fiber mat was impregnated with the paste and rolled between polyethylene films. A similar paste (Example 6B) was prepared except that 150 parts of Gama-Sperse 6532 was used in place of Gama-Sperse LV-10. The viscosity of the paste was 67,000 cps. A glass fiber mat was impregnated with this paste and rolled between polyethylene films. After 72 hours, the impregnated mats were unrolled and examined for completeness of glass mat impregnation and molding quality.

| | Parts by Weight | Viscosity cps |
|---|---|---|
| Example 6A | | |
| Stypol 40-2955 resin | 60 | |
| LP-40A | 33 | |
| Styrene | 7 | |
| t-butyl perbenzoate | 1 | |
| Gama-Sperse LV-10 | 150 | |
| Zinc stearate | 4 | |
| Magnesium oxide | 1 | 45,000 |
| Example 6B | | |
| Stypol 40-2955 resin | 60 | |
| LP-40A | 33 | |
| Styrene | 7 | |
| t-butyl perbenzoate | 1 | |
| Gama Sperse 6532 | 150 | |
| Zinc stearate | 4 | |
| Magnesium oxide | 1 | 67,000 |

The sheet molding compound paste prepared using Gama-Sperse LV-10 completely wetted the glass fiber mat due to the ability of the low viscosity paste to spread over the surface of the reinforcing fibers. Conversely, the higher viscosity paste prepared using Gama-Sperse 6532 did not wet all of the glass fibers in the mat, although the same volume of paste was applied in both preparations. Matched metal die moldings of these sheet molding compounds at 325° F. showed smooth, uniform surface appearance for the sheet molding compound prepared with Gama-Sperse LV-10, while the sheet molding compound prepared with Gama-Sperse 6532 resulted in pits and numerous small blisters on the surface of molded articles due to poor resin distribution. The lower viscosity of the LV-10 greatly facilitated processing of polyester molding compound.

EXAMPLE 7

A wet mat molding compound comprising 100 parts of Stypol 40-2364, 0.5 part benzoyl peroxide, 125 parts Gama-Sperse 6532 and 0.7 part calcium stearate was blended in a Cowles Dissolver for 10 minutes. The viscosity as recorded by a Brookfield Viscometer was 54,000 cps. at 77° F. A similar composition comprising 100 parts of Stypol 40-2364, 0.5 part benzoyl peroxide, 170 parts of Gama-Sperse LV-10 and 0.7 part calcium stearate was found to have a viscosity of 55,000 cps.

In this Example 7, an increased amount of the novel filler of the invention (170 parts by weight) was used in place of the conventional filler (125 parts by weight) and yet the viscosity was substantially the same.

The following data will differentiate the various calcium carbonate powders used in the examples by particle size distribution, by surface area measurements, by sub-sieve size analysis, and by pore volume analysis. From this information, the unique calcium carbonate filler of the invention can be described and claimed.

Table 1

Camel-Wite
Harry T. Campbell Sons Corporation
Towson, Baltimore, Maryland
Particle Size Distribution determined by Sedigraph 5000
(Instrument distributed by
Micrometrics Instrument Corporation
Norcross, Georgia

| Cumulative Mass Percent finer than | Diameter* (Microns, Micrometers) |
|---|---|
| 100 | 18 |
| 95 | 13 |
| 90 | 10 |
| 85 | 8.6 |
| 80 | 7.4 |
| 75 | 6.4 |
| 70 | 5.6 |
| 65 | 5.0 |
| 60 | 4.4 |
| 55 | 4.0 |
| 50 | 3.5 |
| 45 | 3.2 |
| 40 | 2.7 |
| 35 | 2.3 |
| 30 | 2.0 |
| 25 | 1.7 |
| 20 | 1.4 |
| 15 | 1.2 |
| 10 | 0.92 |
| 5 | 0.60 |
| 2 | 0.40 |
| 0 | 0.20 |

*Actual Sedigraph curve

Table 2

Gama-Sperse 6451
(The Gerogia Marble Company
Atlanta, Georgia)
Particle Size distribution - Sedigraph 5000

| Cumulative Mass Percent finer than | Typical Diameter** Value (Microns, Micrometers) |
|---|---|
| 100 | 20 |
| 95 | 16 |
| 90 | 13 |
| 85 | 11.5 |
| 80 | 10.3 |
| 75 | 9.2 |
| 70 | 8.4 |
| 65 | 7.5 |
| 60 | 6.7 |
| 55 | 6.0 |
| 50 | 5.4 |
| 45 | 4.6 |
| 40 | 4.0 |
| 35 | 3.5 |
| 30 | 2.9 |
| 25 | 2.3 |
| 20 | 1.9 |
| 15 | 1.45 |
| 10 | 1.05 |
| 5 | 0.70 |
| 2 | 0.46 |
| 0 | 0.20 |

**Published Values

Table 3

Gama-Sperse 6532
(The Georgia Marble Company)
Atlanta, Georgia)
Particle Size Distribution - Sedigraph 5000

| Cumulative Mass Percent finer than | Typical Diameter** Value (Microns, Micrometers) |
|---|---|
| 100 | 13 |
| 95 | 9.2 |
| 90 | 8.0 |
| 85 | 7.0 |
| 80 | 6.2 |
| 75 | 5.6 |
| 70 | 5.0 |
| 65 | 4.6 |
| 60 | 4.1 |
| 55 | 3.6 |
| 50 | 3.2 |
| 45 | 2.8 |
| 40 | 2.5 |
| 35 | 2.1 |
| 30 | 1.8 |
| 25 | 1.5 |
| 20 | 1.2 |
| 15 | 0.96 |
| 10 | 0.72 |
| 5 | 0.46 |
| 2 | 0.29 |
| 0 | 0.20 |

**Published Values

Table 4

Gama-Sperse LV-10
(The Georgia Marble Company
Atlanta, Georgia)
Particle Size Distribution - Sedigraph 5000

| Cumulative Mass Percent finer than | Diameter Range* (Microns, Micrometers) |
|---|---|
| 100 | 20–22 |
| 95 | 17–18 |
| 90 | 15–17 |
| 85 | 14–16 |
| 80 | 13.5–15 |
| 75 | 13.0–14 |
| 70 | 12.0–13.5 |
| 65 | 11.5–13.3 |
| 60 | 11.0–13.0 |
| 55 | 10.0–12.5 |
| 50 | 9.8–12.0 |
| 45 | 9.0–11.5 |
| 40 | 8.0–10.5 |
| 35 | 6.8–10.0 |
| 30 | 5.1–8.0 |
| 25 | 5.0–5.8 |
| 20 | 2.5–3.5 |
| 15 | 1.7–2.2 |
| 10 | 1.0–1.2 |
| 5 | 0.55–0.65 |
| 2 | 0.35–0.40 |
| 0 | 0.20–0.20 |

*By actual measurement

From these tables it can be seen that at a given cumulative mass percent, the particle size of the calcium carbonate filler of the present invention is greater than for any of the other fillers used. A few examples will make this clear.

| Cumulative Mass Percent | Finer than Gama-Sperse LV-10 (Microns) | Gama-Sperse 6532 (Microns) | Gama-Sperse 6451 (Microns) | Camel-Wite (Microns) |
|---|---|---|---|---|
| 100 | 20–22 | 13 | 20 | 18 |
| 80 | 13.5– 15 | 6.2 | 10.3 | 7.4 |
| 50 | 9.8– 12 | 3.2 | 5.4 | 3.5 |

-continued

| Cumulative Mass Percent | Finer than Gama-Sperse LV-10 (Microns) | Gama-Sperse 6532 (Microns) | Gama-Sperse 6451 (Microns) | Camel-Wite (Microns) |
|---|---|---|---|---|
| 30 | 5.1–8 | 1.8 | 2.9 | 2.0 |

Porosimetry

Pore Volume Analysis

A mercury penetration porosimeter Model 905, Micromeritics Instrument Corp. was employed to determine the pore volume of selected calcium carbonate fillers. Pore volume analyses indicate that calcium carbonate fillers have non-porous surfaces. The porosity values actually are void volume determinations arising from the spaces between particles in packed powders. The void volume is a function of the packing arrangement of the variously sized particles in a powder. Lower values indicate a more complete packing of particles such as indicated by the lower value obtained for LV-10 due to the unique particle size distribution.

|  | Porosity (%) |
|---|---|
| Camel-Wite | 64.21 |
| Gama-Sperse 6451 | 55.12 |
| Gama-Sperse LV-10 | 52.87 (below 53) |

From this data, it is clear that the novel calcium carbonate filler of the invention has a porosity percentage below 53.

Fisher Sub-Sieve Sizer

Characterization of calcium carbonate fillers by Fisher Sub-Sieve Sizer. This device is commonly employed in the filler industry as a quality control tool and to differentiate mineral filler products in the size range of 0.2 microns to 50 microns. The instrument employs the air permeability principle in determining the average diameter of particles in a sample. The instrument may be purchased from Fisher Scientific Co., Pittsburgh, Pennsylvania.

The following values are used to characterize (in part) the fillers mentioned:

|  | Sub-Sieve Diameter (Microns) |
|---|---|
| Gamma-Sperse 6532 | 1.60–1.80 |
| Gamma-Sperse 6451 | 1.90–2.20 |
| Gamma-Sperse LV-10 | 2.60–2.90 |
| Camel-Wite | avg. 2.0 |

Comment

Gama-Sperse LV-10 has a larger average particle diameter than other fillers in the same size range due to the unusual particle size distribution.

Surface Area

Characterization of calcium carbonate fillers by specific surface measurements. The Model 2205 Automatic Surface Area Analyzer, Micromeritics Instrument Corp. was designed for low surface area materials with specific surface areas from 0.2 $m^2$/gram to 100 $m^2$/gram. The unit employed for these measurements uses Argon gas as the adsorbate, and is particularly useful in the range of 0.5 $m^2$/gram to 5.$m^2$/gram.

|  | Approximate Specific Surface Area (Square Meters/gram) |
|---|---|
| Gama-Sperse 6532 | 2.80 |
| Gama Sperse 6451 | 2.70–2.60 |
| Gama Sperse LV-10 | 1.75–2.00 |
| Camel-Wite | 2.76 |

While all these fillers have low specific surface areas, Gama-Sperse LV-10 has specific surface area at or below 2.0 $m^2$/gram. This is due to the unusual particle size distribution and is not characteristic of fillers in this size range.

In summary, the present invention describes and claims a novel calcium carbonate filler with a particle size distribution as determined by a Sedigraph 5000 analyzer to be within a given range having a limited pore volume porosity, having a range of average particle sizes and having a surface area in square meters per gram different from other calcium carbonate fillers. The physical properties as determined by measurement define a calcium carbonate filler which has unusual properties resulting in improved molding compounds, in less expensive molding compounds and molding compounds with better molding properties.

POLYESTER RESIN

Paraplex P-19D

Rohm and Haas

Type: Two-component, low-shrink polyester resin system consisting of:
  60% Paraplex P-340 highly reactive polyester resin, styrene monomer.
  40% Paraplex P-701 acrylic polymer dissolved in styrene monomer.
The above ratio is recommended for minimum shrinkage.
Uses: Suitable for mat, preform, premix, bulk molding compound and sheet molding compound molding where surface smoothness is required.

| Typical Properties (uncured resin) | |
|---|---|
| P-340 | |
| Viscosity at 25° C. | 970 cps |
| % solids | 65.9 |
| Specific Gravity | 1.120–1.140 |
| SPI gel time at 180° F. | 6–9 minutes |
| SPI peak exotherm | 458° F. |
| Acid number | 22.5 |
| P-701 | |
| Viscosity at 25° C. | 1400 cp |
| % solids | 33.3 |
| Specific Gravity | 0.980 |

Glidpol 4297*

Glidden-Durkee

Type: Single-component, low-shrink polyester, styrene monomer.
Uses: Low profile molding system recommended for bulk molding compound, sheet molding compound, and wet molding process.

| Typical Properties (uncured resin) | |
|---|---|
| Viscosity at 77° F. | 1100–1400 cps. |
| Weight per gallon | 8.76 lbs. |
| SPI gel time 180° F. | 12.0 minutes |
| SPI peak exotherm | 425° F. |

Typical Properties (cured resin)
(None listed)
*All data from Manufacturer's product bulletin.

Paraplex P-19P

Rohm and Haas

Type: Two-component, pigmentable, low-shrink polyeater resin consisting of:
60% Paraplex P-340 highly reactive polyester resin, styrene monomer.
40% Paraplex P-713 acrylic polymer syrup dissolved in styrene monomer.
The above ratio is recommended for minimum shrinkage.

| Typical Properties (uncured resin) | |
|---|---|
| P-340 | |
| Viscosity at 25° C. | 970 cps. |
| % solids | 65.9 |
| Specific gravity | 1.120 |
| SPI gel time 180° F. | 9.6 minutes |
| SPI peak exotherm | 450° F. |
| P-713 | |
| Viscosity at 75° C. | 1550 cps. |
| % solids | 29.5 |
| Specific Gravity | 0.950 |

Stypol 40-2955*

Freeman Chemical Corp.

Type: Isophthalic polyester, styrene monomer.
Uses: Rigid resin for compression molding sheet molding compound, premix, preform and mat low profile parts where a special "low profile additive" is incorporated into the formulation.

| Typical Properties (uncured resin) | |
|---|---|
| Specific gravity | 1.115 |
| Viscosity at 25° C. | 1700 cps (Brookfield) |
| SPI gel time at 180° F | 5.5 minutes |
| SPI peak exotherm | 425° F. |
| Typical properties (cured resin) | |
| Barcol hardness | 49 |
| Heat distortion point | 126° C. (264 psi) |
| Specific Gravity | 1.190 |

*All data from Manufacturer's product bulletin.

LP-40A

Union Carbide Corp., New York, N.Y.

Type: Thermoplastic acrylic polymer dissolved in styrene monomer.
Uses: A special "low-profile additive" for polyester molding compositions where shrinkage is to be minimized.

| Typical Properties (uncured resin) | |
|---|---|
| Viscosity at 25° C. | 4250 cps |
| % solids | 40 |

Stypol 40-2364*

Freeman Chemical Corp., Port Washington, Wis.

Type: Isophthalic Polyester, styrene monomer.
Uses: Medium reactive resilient resin for matched metal die molding and premix molding.

| Typical Properties (uncured resin) | |
|---|---|
| Specific Gravity | 1.152 |
| Viscosity at 25° C. | 2850 cps (Brookfield) |
| SPI gel time 180° F. | 6.5 minutes |
| SPI peak exotherm | 415° F. |
| Typical Properties (cured resin) | |
| Barcol hardness | 41 |
| Heat distortion point | 77° C. (264 psi) |
| Specific Gravity | 1.20 |

*All data from Manufacturer's product bulletin.

PEROXIDE CATALYSTS

Tert.-Butyl Perbenzoate (Peroxybenzoate)

Pennwalt Lucidol Chemicals

Type: Peroxide type catalyst, good stability. Heat activated. decomposition into free radicals.
Use: Widely used in matched die molding (prepreg, preform, sheet molding compound, bulk molding compounds) of polyester resin systems.
Properties: Liquid 98% active ingredient.
Typical use is in polyester molding compound but other peroxides may be used to cure polyester molding compositions:
e.g. Benzoyl peroxide (Example 7)
2,4-dichlorbenzoyl peroxide
2,5-dimethyl-2,5-Bis (Benzoylperoxy) Hexane
tert.-Butyl hydroperoxide

COMMON CHEMICAL RESINS

Polyester resin—linear polyesters containing unsaturation which provides sites for subsequent cross-linking reactions. Prepared by the condensation reaction of a diol with a mixture of an unsaturated dibasic acid and a saturated dibasic acid (or corresponding anhydrides of same). The linear polyesters are commonly dissolved in liquid vinyl monomers which, upon initiation, serve as cross-linking agent. Monomers reduce viscosity and facilitate the impregnation of substrates and wetting of fillers and reinforcing in the preparation of molding compositions.
e.g. - diol - propylene glycol, ethylene glycol, diethylene glycol, neopentylene glycol.
- unsaturated dibasic acid or anhydride - maleic acid, maleic anhydride, fumaric acid, chlorofumaric acid.
- saturated dibasic acid or anhydride - phthalic acid, phthalic anhydride, adipic acid, "nadic" anhydride, sebacic acid.
Vinyl monomers—Styrene, methyl methacrylate, vinyl toluene, diallyl phthalate, triallyl cyanurate (or mixtures of above).

OTHER INGREDIENTS

Initiators of cross-linking reaction—Generally comprising that group of substances known as peroxy and hydroperoxy compounds which rapidly decompose into free radicals.

Methyl ethyl ketone peroxide, cyclohexanone peroxide, benzoyl peroxide, tert.-butyl perbenzoate, cumene hydroperoxide.

Activators (accelerators) are often used in order to speed up the decomposition of the peroxy initiator.

e.g.—Salts of metals: cobalts, cerium, iron, manganese, tin, vanadium such as the naphthenates and octoates; and tertiary amine compounds: dimethylaniline, diethylaniline, dimethyl-p-toluidine.

PROCESSING—GENERAL

Polyester resins are useful in the preparation of laminates, and in various kinds of molding compounds which are subsequently formed into shapes by a variety of molding techniques.

MOLDING COMPOUND

Essentially a mixture of polyester resin, filler, catalyst, a mold release agent and some form of reinforcement such as glass fiber. Colorants and many other specialty ingredients are frequently combined with the above mixture. It may be conveniently prepared in a spiral blade or sigma blade mixer by blending various combinations of the above ingredients to a dough-like consistency, (bulk molding compound). Other methods of preparation include the formation of a paste comprising all but the reinforcement, which is added in a subsequent step to produce a thin layer between sheets of nonpermeable films, (sheet molding compound).

CALCIUM CARBONATE FILLERS

Physical Data of Camel-Wite

| Particle Size Distribution | Cumulative Mass Percent |
|---|---|
| Finer than 40 microns | — |
| 30 microns | — |
| 25 microns | — |
| 20 microns | — |
| 10 microns | — |
| 8 microns | 100% |
| 6 microns | 84 |
| 5 microns | 78 |
| 4 microns | 70 |
| 2 microns | 50 |
| Physical Data | Camel-Wite |
| Specific Gravity | 2.80-2.71 |
| One lb. bulk (gallons) | 0.0443 |
| Wt. per Solid Gal. (lbs.) | 22.57 |
| pH of Saturated Sol. | 9.5 |
| Index of Refraction | 1.6 |
| Oil Absorption (lbs./100 lbs.) | 15 |
| Average Particle Dia. | 2.0 microns |
| Particle Range | 0.3 to 8.0 microns |
| Dry Brightness (G.E. 550 Ang.) | 96 |
| Bulk Density (Loose) (lbs./cu./ft.) | 40 |
| Solubility in water (%) | 0.08 |
| Moh Hardness | 3.0 |

Physical Data of Gama-Sperse LV-10, Gama-Sperse 6532, Gama-Sperse 6451

Gama-Sperse LV-10 has been designed for use in liquid Polyester systems. It is a finely ground Calcium Carbonate with less than .008% being retained on a U.S. 325 Wet Screen.

| Hardness (Moh's scale) | 3.0 |
|---|---|
| Specific Gravity | 2.71 |
| Typical Chemical Composition: | |
| Total Carbonates (Ca,Mg) | 95.0% Minimum |
| MgCO$_3$ | 3.0 Maximum |
| Al$_2$O$_3$ | 0.1% to 0.35% |
| Fe$_2$O$_3$ | .02% to .16% |
| SiO$_2$ | .02% to 1.4% |

| | |
|---|---|
| Mn | Trace |

We claim:

1. A calcium carbonate filler powder characterized by a porosity of less than 53 percent by pore volume analysis, by a Fisher Sub-Sieve Sizer diameter of between 2.60 and 2.90 microns, by a specific surface area of between 1.75 and 2.00 square meters per gram and by a particle size distribution as determined by a Sedigraph 5000 Analyzer as follows:

| Cumulative Mass Percent | finer than | Diameter Range (Microns, Micrometers) |
|---|---|---|
| 100 | | 20 – 22 |
| 95 | | 17 – 18 |
| 90 | | 15 – 17 |
| 85 | | 14 – 16 |
| 80 | | 13.5 – 15 |
| 75 | | 13.0 – 14 |
| 70 | | 12.0 – 13.5 |
| 65 | | 11.5 – 13.3 |
| 60 | | 11.0 – 13.0 |
| 55 | | 10.0 – 12.5 |
| 50 | | 9.8 – 12.0 |
| 45 | | 9.0 – 11.5 |
| 40 | | 8.0 – 10.5 |
| 35 | | 6.8 – 10.0 |
| 30 | | 5.1 – 8.0 |
| 25 | | 5.0 – 5.8 |
| 20 | | 2.5 – 3.5 |
| 15 | | 1.7 – 2.2 |
| 10 | | 1.0 – 1.2 |
| 5 | | 0.55 – 0.65 |
| 2 | | 0.35 – 0.40 |
| 0 | | 0.20 – 0.20 |

2. A calcium carbonate filler powder characterized by a porosity of less than 53 percent by pore volume analysis, by a Fisher Sub-Sieve Sizer diameter of between 2.60 and 2.90 microns, by a specific surface area of between 1.75 and 2.0 square meters per gram and by a particle size distribution as determined by a Sedigraph 5000 analyzer as follows:

| Cumulative Mass Percent | finer than | Diameter (Microns, Micrometers) |
|---|---|---|
| 100 | | 21 |
| 95 | | 17.5 |
| 90 | | 16 |
| 85 | | 15 |
| 80 | | 14.2 |
| 75 | | 13.5 |
| 70 | | 12.7 |
| 65 | | 12.3 |
| 60 | | 12 |
| 55 | | 11.2 |
| 50 | | 10.5 |
| 45 | | 10.2 |
| 40 | | 9.2 |
| 35 | | 8.4 |
| 30 | | 6.5 |
| 25 | | 4.9 |
| 20 | | 3.0 |
| 15 | | 2.0 |
| 10 | | 1.1 |
| 5 | | .60 |
| 2 | | .37 |
| 0 | | .20 |

3. A calcium carbonate filler powder characterized by a particle size distribution as determined by a Sedigraph 5000 analyzer as follows:

| Cumulative Mass Percent | finer than | Diameter Range (Microns, Micrometers) |
|---|---|---|
| 100 | | 20 – 22 |
| 95 | | 17 – 18 |
| 90 | | 15 – 17 |
| 85 | | 14 – 16 |
| 80 | | 13.5 – 15 |
| 75 | | 13.0 – 14 |
| 70 | | 12.0 – 13.5 |
| 65 | | 11.5 – 13.3 |
| 60 | | 11.0 – 13.0 |
| 55 | | 10.0 – 12.5 |

-continued

| Cumulative Mass Percent | finer than | Diameter Range (Microns, Micrometers) |
|---|---|---|
| 50 | | 9.8 – 12.0 |
| 45 | | 9.0 – 11.5 |
| 40 | | 8.0 – 10.5 |
| 35 | | 6.8 – 10.0 |
| 30 | | 5.1 – 8.0 |
| 25 | | 5.0 – 5.8 |
| 20 | | 2.5 – 3.5 |
| 15 | | 1.7 – 2.2 |
| 10 | | 1.0 – 1.2 |
| 5 | | 0.55 – 0.65 |
| 2 | | 0.35 – 0.40 |
| 0 | | 0.20 – 0.20 |

* * * * *